T. E. MURRAY.
PROTECTIVE CASING FOR ELECTRIC METERS.
APPLICATION FILED JAN. 25, 1912.
1,048,856.
Patented Dec. 31, 1912.
3 SHEETS—SHEET 2.
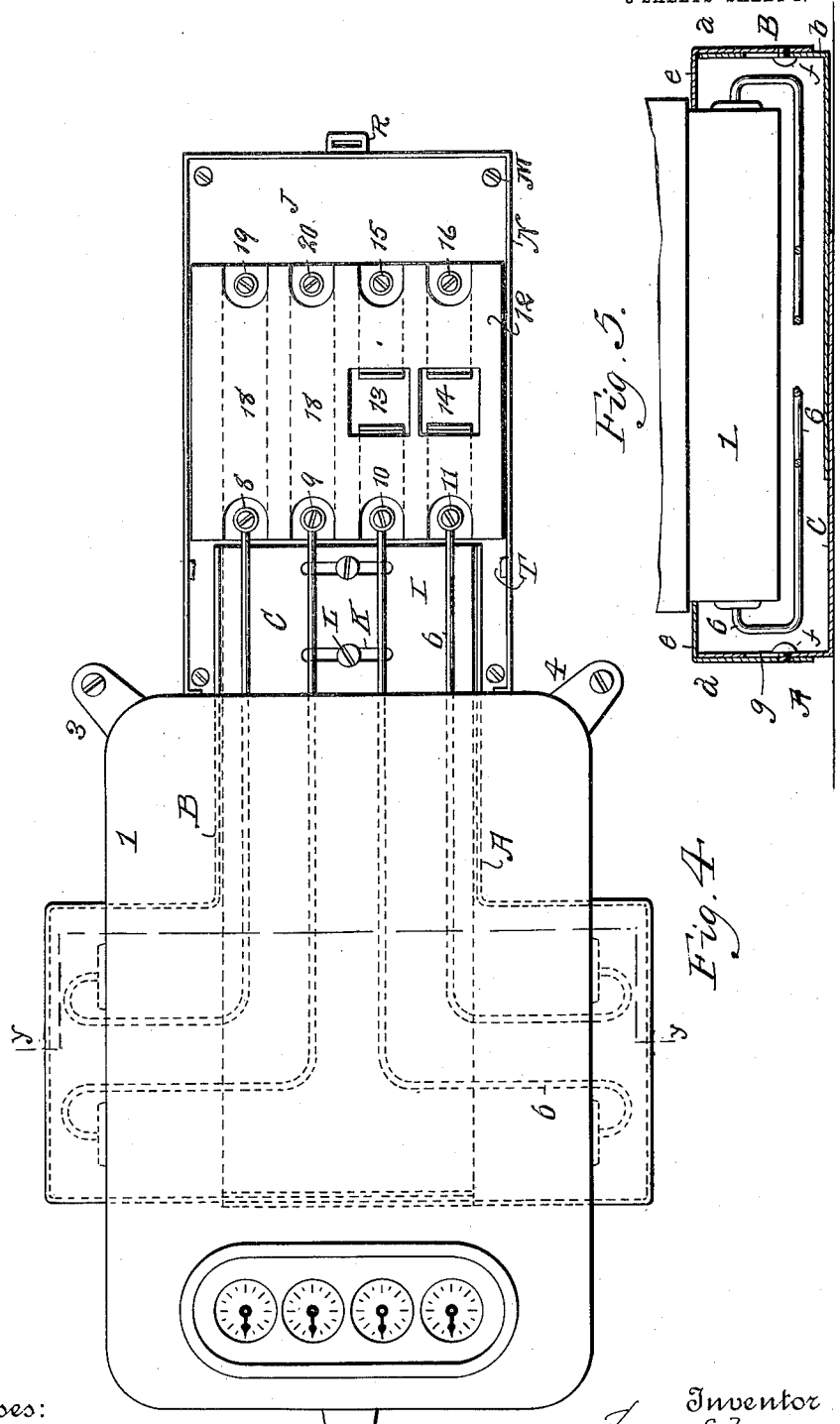

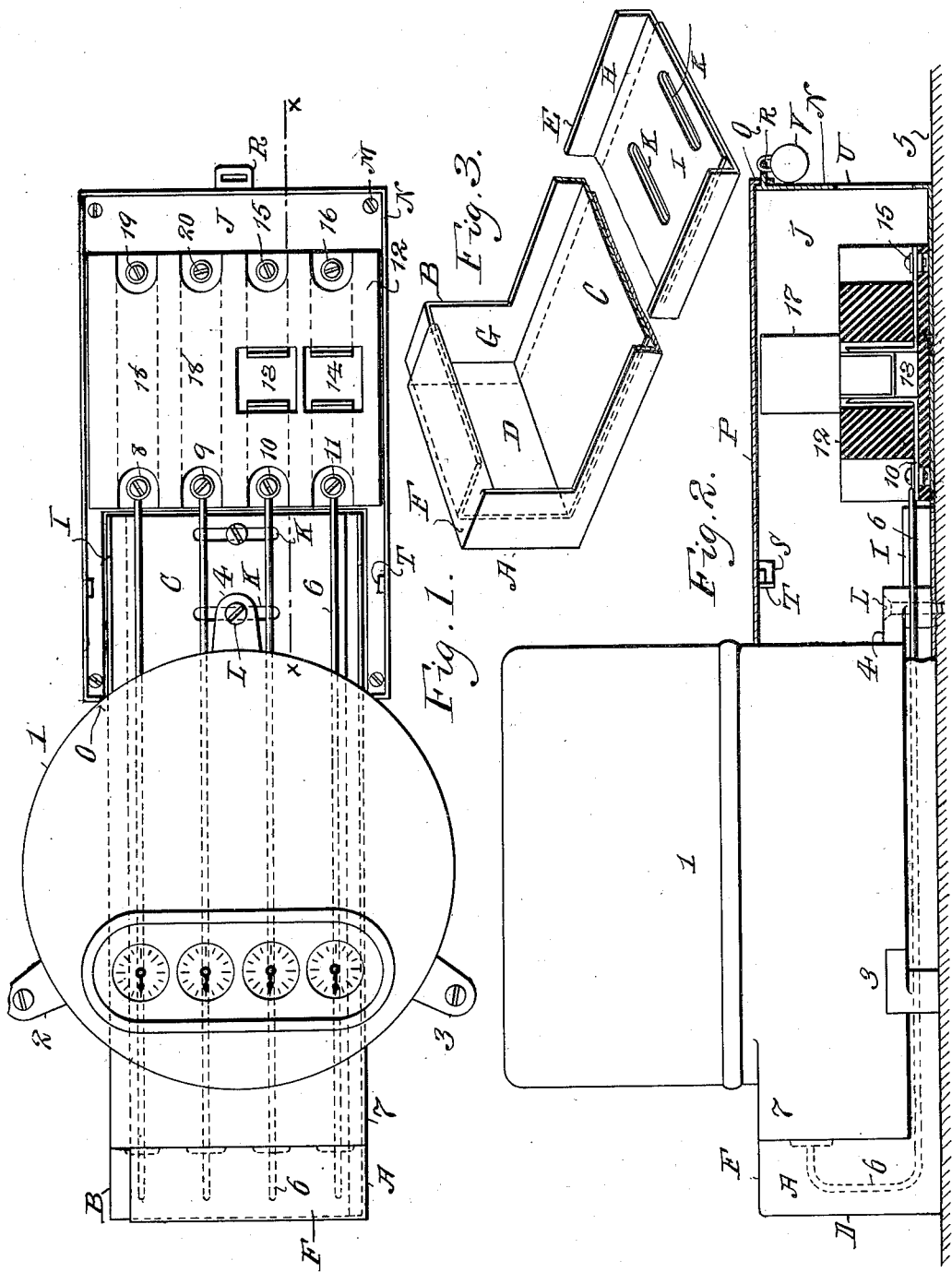

T. E. MURRAY.
PROTECTIVE CASING FOR ELECTRIC METERS.
APPLICATION FILED JAN. 25, 1912.

1,048,856.

Patented Dec. 31, 1912.

3 SHEETS—SHEET 3.

Witnesses:
May T. McGarry
Gertrude T. Porter

Inventor
Thomas E. Murray
By his Attorney

UNITED STATES PATENT OFFICE.

THOMAS E. MURRAY, OF NEW YORK, N. Y.

PROTECTIVE CASING FOR ELECTRIC METERS.

1,048,856.  Specification of Letters Patent.  Patented Dec. 31, 1912.

Application filed January 25, 1912. Serial No. 673,452.

*To all whom it may concern:*

Be it known that I, THOMAS E. MURRAY, a citizen of the United States, residing at New York, in the county of New York and State of New York, have invented a certain new and useful Improvement in Protective Casings for Electric Meters, of which the following is a specification.

The invention is a protective casing for the leads of an electric meter and for the cut-out device to which said leads may be connected, the said casing being constructed to inclose the joints between the meter casing and the meter leads, also said leads, and also the cut-out.

Figure 6:
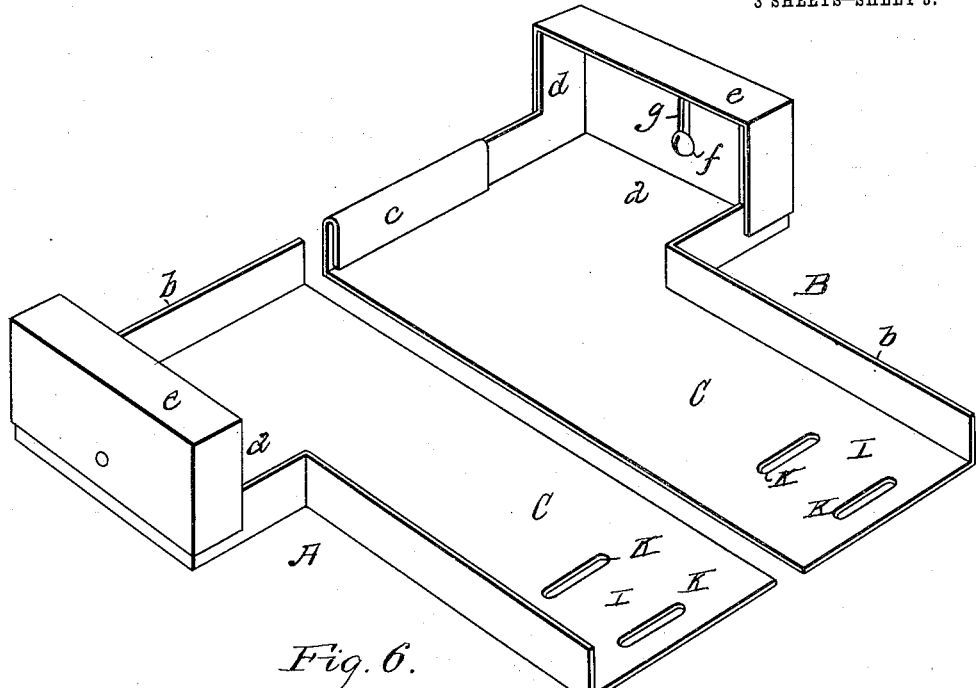
Figure 7:
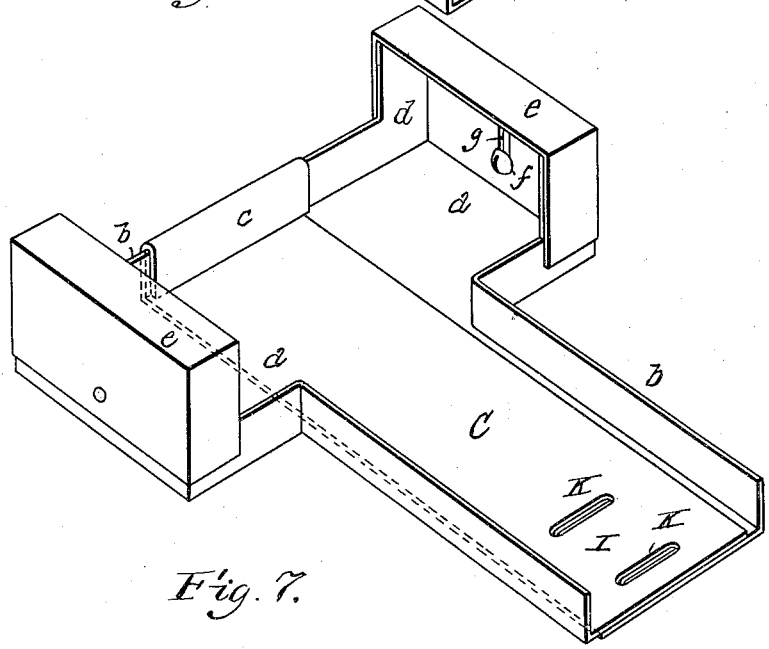

In the accompanying drawings—Figure 1 is a plan view of the device applied to a meter having a cylindrical casing, with the cover of the cut-out box removed. Fig. 2 is an elevation and partial longitudinal section on line x, x of Fig. 1. Fig. 3 is a perspective view of the meter pans of Fig. 1, telescoped together. Fig. 4 is a plan view of the device applied to a meter having a quadrangular casing, the cover of the cut-out box being removed. Fig. 5 is a transverse section of the pans A, B, on the line y, y of Fig. 4, the meter casing being in elevation. Fig. 6 shows in perspective and separately, the meter pans A, B which coöperate with the meter casing of Fig. 4, and Fig. 7, the same with the pans telescoped together.

Similar letters and numbers of reference indicate like parts.

Referring to Figs. 1, 2 and 3, 1 is an electric meter of any suitable type, with its casing here shown in cylindrical form, supported on legs 2, 3, 4, which are secured to the base 5. The meter leads 6 extend relatively parallel from an offset 7 on the meter casing and pass between said casing and the base, and are secured to the terminals 8, 9, 10, 11 in the cut-out block 12. My protective casing is in two communicating sections. The first section comprises the pans A, B, of sheet metal, each formed with a bottom plate C, an end flange D, a side flange E, and a top plate F. The portion G of the side flange E covered by the top plate F is higher than the remaining portion H of the flange. The side flanges at G, the top plate F and the end flange D form a compartment, to inclose the joints between the meter leads and the meter casing, as hereafter explained. The top plate F of pan A is turned over at its edge, so that when the two pans are placed together, as shown in Fig. 3, the top plate F of pan B telescopes in said turned over portion, the flanges D and bottom plates C then overlapping. The two pans are placed so that the edges of the top plates F and flanges D meet the straight edge of the casing offset 7, and so that the upper edges of the portions H of flanges E approximate the bottom face of said casing. The length of the pans is such that they extend beyond the meter casing, as shown at I. Through both bottom plates C in this part are formed transverse slots K for the reception of screws L, by means of which the pans A, B are secured to the base.

The cut-out box device 12 may be of any desired form. As herein shown, it is a block of porcelain or other refractory insulating material, in which are two sockets 13, 14. The supply leads may be connected to the terminals 15, 16 of two metal strips which pass through the body of the block and are upwardly turned in the sockets 13, 14. Two of the meter leads are connected to the terminals 10, 11 of two similar metal strips which pass through the body of the block and are also upwardly turned in said sockets. In this way, spring clips are formed in each socket for the reception of fuse plugs, one of which is shown at 17, Fig. 2. The remaining meter leads are connected to the terminals 8, 9 of metal strips 18 which extend through the block, and the load leads may be connected to the terminals 19, 20 of said strips.

The second section of my protective casing is a sheet metal pan J, secured to the base by internal screws M, which receives the cut-out block 12. Said pan has a rim flange N, which is to be higher than the seated fuse plug 17, as shown in Fig. 2. One end of said pan is cut away to receive the portion I of pans A, B, which extends beyond the meter casing, and to permit said end to be brought closely against said meter casing, as shown at O, so that the meter casing coöperates with said pan in inclosing the cut-out block.

P is a metal cover for the pan J, cut out at one end to fit against the meter casing and having a flange Q at the other end. Said flange has an opening to receive the slotted projection R on pan J. On the under side of the cover are hooks S which engage with studs T on the inner side of flange N.

In assembling the device, the meter is placed on the base, and the fastening screws in legs 2 and 3 are inserted. The pans A, B are then pushed under the meter until the edges of top plates F and flanges D meet the offset 7. The pans are telescoped together, as described, until their side flanges E meet the sides of the meter casing. Fastening screws L are then inserted through the slots K, one of said screws also passing through the meter leg 4. The cut-out box pan J is then fastened in place, as described. The cut-out block is put into it, and the connections made to the meter at terminals 8, 9, 10, 11 and to supply and load at terminals 15, 16, 19, 20, the supply and load leads being carried through an opening U in one end flange of the pan. The cover P is then put in position, the hooks S engaging studs T and the flange Q receiving projection R. Said cover is finally secured by a seal fastening V, the shackle of which is passed through the slot in projection R.

The construction of my device above described is especially adapted to the form of meter casing shown in Fig. 1, in which the meter leads are all at one side of the meter casing. Where said leads are at opposite sides of the casing, which is usually the case when said casing is quadrangular, I modify the shape of the pans A, B, as shown in Figs. 4, 5, 6. Each pan has a bottom plate C provided with a side offset $a$. A flange $b$ extends along one end of the pan, around said offset and along the adjacent side. At said end a portion of the flange $b$ is bent over, as shown at $c$, and in this bent portion the flange of the opposite pan A telescopes. At the ends of the offsets $a$ the flange $b$ is made higher than elsewhere, as shown at $d$, and extending over said ends are movable covers $e$ attached to the flanges $b$ by clamping screws $f$ passing through slots $g$. In assembling this form of my device, the pans A, B are first set on the base. The meter is placed between them and its legs are secured to the base. The pans are then telescoped together, until the edges of the high flanges $d$ on the offsets $a$ meet the sides of the meter casing. The covers $e$ are suitably adjusted to permit the pans to cover completely the joints between meter leads and meter casing. The pans are then secured by the screws L and the cut-out block and remaining portions of the device are attached and connected in the manner already described.

It is to be noted that the pans A, B coöperate with the meter casing and with the pan J and cover P completely to protect the leads between meter and cut-out block, while the pan J and cover P protect the cut-out block and its meter, load and circuit connections. There is no way of getting access to the connections, leads or fastening screws, except by removing the cover P, and this cannot be done except by breaking the seal fastening V.

In case the leads 6 of the meter of Fig. 4 should be carried in the opposite direction to that shown, the pans A, B may be reversed end for end and the pan J and cut-out block applied to the end of the casing which carries the leg 2; said leg then registering with one of the slots K and being fastened by screw L in the same way as the leg 4 in Fig. 1.

I claim:

1. In combination with a base, a meter casing, a cut-out, and meter leads between said meter casing and cut-out, a casing formed in two communicating sections, one of said sections inclosing the joints between said meter casing and said leads and part of said leads and protruding beyond said meter casing, and the other section inclosing said cut-out, the remainder of said leads and the protruding portion of said first section, and means within said sections for securing the same to said base: the said last-named section having a movable portion affording access to said cut-out.

2. In combination with a base, a meter casing, a cut-out, and meter leads between said meter casing and cut-out, a casing formed in two communicating sections, one of said sections coöperating with said meter casing to inclose the joints between said meter casing and said leads and part of said leads, and the other section coöperating with said meter casing to inclose said cut-out and the remainder of said leads, and means within said sections for securing the same to said base: the said last-named section having a movable portion affording access to said cut-out.

3. In combination with a base, a meter casing supported thereon and, at a distance therefrom, leads extending from said casing and between said casing and said base, two pans having bottom plates and flanges thereon disposed side by side and constructed to telescope laterally one upon the other, and means for securing said pans in mutually adjusted position: the said pans having compartments coöperating with said casing to inclose the joints between meter casing and leads and extending between said casing and said base and coöperating with the under side of said casing to inclose said leads.

4. In combination with a base, a meter casing supported on said base and, at a distance therefrom, leads extending from opposite sides of said casing and between said casing and said base, two pans having bottom plates and flanges thereon disposed side by side and constructed to telescope laterally one upon the other, and means for securing said pans in mutually adjusted position:

each of said pans having a compartment coöperating with said casing to inclose the joints between meter casing and leads, and both of said pans extending between said casing and said base and coöperating with the under side of said casing to inclose said leads.

5. In combination with a base, a meter casing supported thereon and, at a distance therefrom, leads extending from said casing and between said casing and said base, two pans having bottom plates and flanges thereon disposed side by side and constructed to telescope laterally one upon the other, and means for securing said pans in mutually adjusted position: the said pans having compartments coöperating with said casing to inclose the joints between meter casing and leads and extending between said casing and said base and coöperating with the under side of said casing to inclose said leads, a cut-out device connected to said leads, and a casing secured to said base and coöperating with said meter casing to inclose said cut-out device.

6. In combination with a base, a meter casing supported thereon and, at a distance therefrom, leads extending from said casing and between said casing and said base, two pans having bottom plates and flanges thereon disposed side by side and constructed to telescope laterally one upon the other, and means for securing said pans in mutually adjusted position: the said pans having compartments coöperating with said casing to inclose the joints between meter casing and leads and extending between said casing and said base and coöperating with the under side of said casing to inclose said leads, a cut-out device connected to said leads, a pan receiving said cut-out device and having side flanges coöperating with said meter casing to surround said cut-out device, a detachable cover for said pan having an edge bearing against said casing, and a seal fastening for said cover.

In testimony whereof I have affixed my signature in presence of two witnesses.

THOMAS E. MURRAY.

Witnesses:
GERTRUDE T. PORTER,
MAY T. MCGARRY.